United States Patent [19]

Giger

[11] Patent Number: 4,495,648

[45] Date of Patent: Jan. 22, 1985

[54] TRANSMITTER POWER CONTROL CIRCUIT

[75] Inventor: Adolf J. Giger, Boxford, Mass.

[73] Assignee: AT&T Bell Laboratories, Murray Hill, N.J.

[21] Appl. No.: 453,513

[22] Filed: Dec. 27, 1982

[51] Int. Cl.[3] .............................................. H04B 1/38
[52] U.S. Cl. ....................................... 455/73; 455/10; 455/15; 455/52; 455/69
[58] Field of Search ................. 455/17, 52, 50, 63, 455/65, 68, 69, 10, 70, 9, 15, 73, 88; 375/58

[56] References Cited

U.S. PATENT DOCUMENTS

| | | | |
|---|---|---|---|
| 2,425,614 | 8/1947 | Goddard | 455/69 |
| 2,896,073 | 7/1959 | Westphal | 455/69 |
| 2,924,703 | 2/1960 | Sichak et al. | 455/69 |
| 3,195,047 | 7/1965 | Ruthroff | 455/69 |
| 3,271,679 | 9/1966 | Fostoff | 455/69 |
| 3,415,952 | 12/1968 | Blackburn et al. | 455/17 |
| 3,732,496 | 5/1973 | Boyer | 455/73 |
| 4,004,224 | 1/1977 | Arens et al. | 455/52 |

FOREIGN PATENT DOCUMENTS 0122246 9/1981 Japan .................................. 455/69

*Primary Examiner*—Marc E. Bookbinder
*Attorney, Agent, or Firm*—Sylvan Sherman; Erwin W. Pfeifle

[57] ABSTRACT

In a radio communication system, an adaptive transmitter power control system is described wherein the signal level at each receiver is monitored and a control signal, which is a function of the signal level, is transmitted back to the transmitting station to adjust the transmitter output power, as required. By transmitting the lowest power level consistent with system objectives, the repeater circuits operate in a highly linear mode, and cochannel interference is significantly reduced.

18 Claims, 2 Drawing Figures

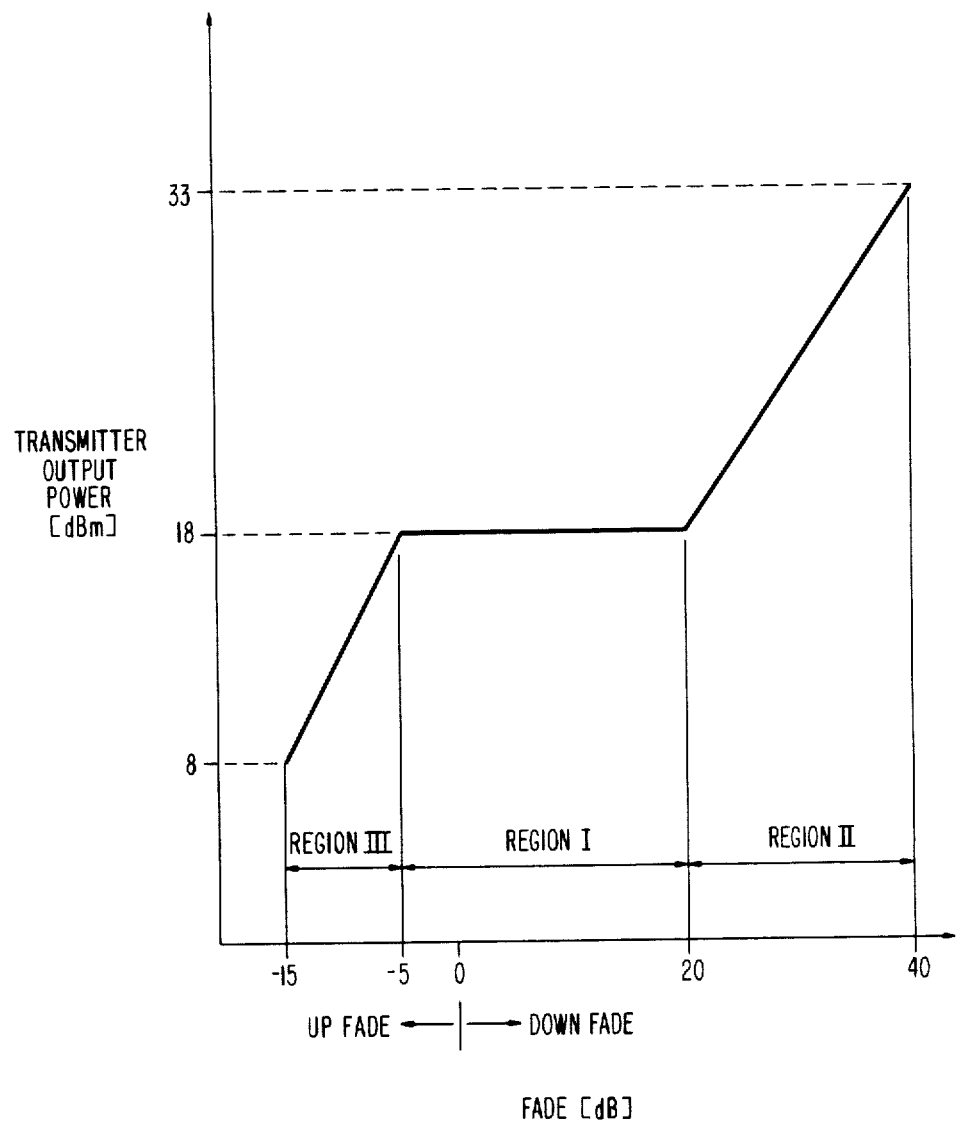

TRANSMITTER POWER CONTROL CIRCUIT

TECHNICAL FIELD

This invention relates to radio communication systems and, more particularly, to arrangements for controlling the transmitter output power.

BACKGROUND OF THE INVENTION

The output power of a transmitter in a radio communication system is based upon the transmission objectives set forth for the system. These are derived from grade-of-service analyses of the results of subjective and objective tests. In digital radio systems, for instance, the problem is that in order to meet system objectives under adverse propagation conditions the power level required is considerably greater than the level needed during more normal conditions. In particular, it is only during the short periods of deep fading that high transmitter output power is required. This characteristic is peculiar to digital radio systems which can satisfactorily operate (at low error rates) very close to their threshold of operation where the error rate exceeds a certain limit. In contrast, analog FM and AM radio systems require high transmitter power at all times because of the cumulative nature of its thermal noise contribution.

It is, accordingly, the broad objective of the invention to control the transmitter output power in digital radio communication systems.

SUMMARY OF THE INVENTION

In accordance with the present invention, the received signal power of the digital signal is monitored at the receiver and a control signal is transmitted back to the transmitter to adjust the transmitter output power, as required.

The advantages of transmitting at reduced power levels are many in digital radio systems. First, the lower transmitted powers under normal propagating conditions allow operation of the repeater circuits in a highly linear mode. This is very important for the high level (i.e., 64QAM) modulation schemes used today or contemplated in the future. Such modulation methods contain a high degree of amplitude modulation which could be adversely affected by nonlinear repeater circuits. The two degradations of importance are eye degradation and spectrum spreading. The former affects bit error rate. The latter affects interference into adjacent channels. During the rare events of very deep fades the transmitter power will be maximum and the nonlinear distortion will increase. Fortunately at this extreme point, where the error rate reaches a very high value ($10^{-3}$), the nonlinear distortions are considerably less destructive.

A second benefit of transmitter power control is that cochannel and adjacent channel interferences are significantly reduced. This will permit the coexistence of digital and analog systems sharing the same frequency band without resorting to such measures as space diversity antenna systems.

A third advantage of transmitter power control is the possibility of operating digital radio systems without using regeneration in every repeater station. The low nonlinear distortions, which approach single sideband conditions, may make regeneration only necessary in radio switching stations, a substantial operational benefit. Finally, there may be the simple power saving that results from operating at lower power levels.

BRIEF DESCRIPTION OF THE DRAWING

FIG. 2 shows an illustrative power control characteristic.

DETAILED DESCRIPTION

Figure 1:
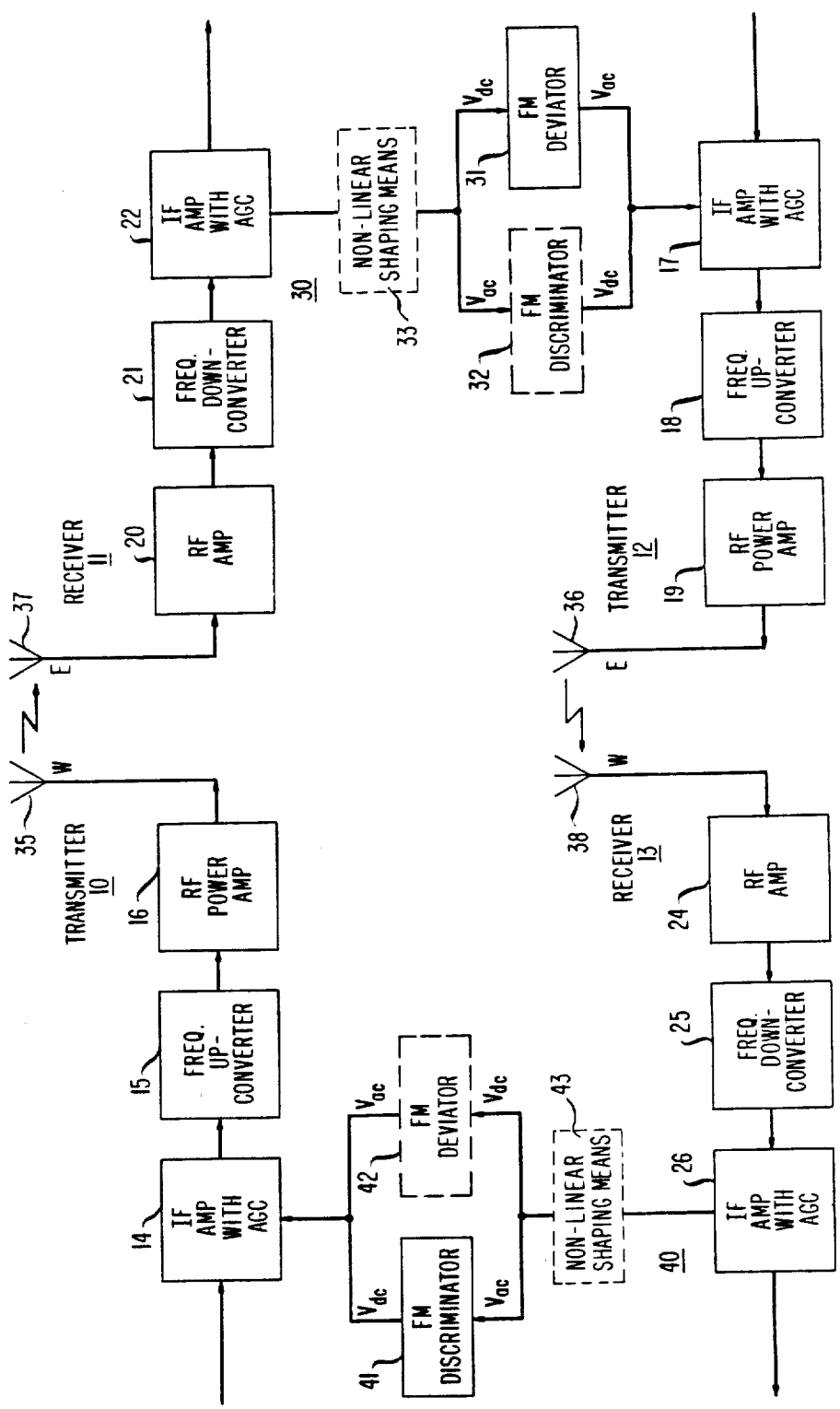
FIG. 1 shows a radio system in accordance with the present invention.

Referring to the drawings, FIG. 1 shows the relevant components of a two-way radio communication system. Included are portions of a transmitter 10 and receiver 11 of a west-to-east communication link and portions of a transmitter 12 and receiver 13 of an east-to-west link. Each of the transmitter portions 10, 12 shown comprises an i.f. amplifier with AGC 14, 17; a frequency up-converter 15, 18; an r.f. power amplifier 16, 19; and antennae 35, 36. Receiver portions 11, 13 shown comprise antennae 37, 38; low noise r.f amplifiers 20, 24; frequency down-converters 21, 25; and i.f. amplifiers with AGC 22, 26.

In accordance with this embodiment of the invention the two links are interconnected by means of feedback circuits 30 and 40 which connect the AGC circuits of the i.f. amplifiers 22, 26 of receivers 11 and 13, to the AGC circuits of the i.f. amplifiers 17, 14 respectively, of transmitters 12 and 10.

In the absence of feedback circuits 30 and 40, each transmitter is designed to have a constant power output which is sufficiently high to provide a certain level of overall system performance during periods of deep fades. However, as noted above, this high power level is not required most of the time. Accordingly, the system is modified to transmit at a level that is a function of the existing propagation conditions, as determined by the carrier signal level at the receiver. Thus, with respect to transmission in the west-to-east direction, the AGC voltage developed in i.f. amplifier 22 in receiver 11, which is essentially a d.c. voltage, and is a measure of the received signal level, is applied to FM deviator 31 whose output is an a.c. signal whose frequency is a function of the applied AGC voltage. This a.c. signal is coupled to the AGC circuit of i.f. amplifier 17 of transmitter 12 and serves to superimpose a modulation upon the amplitude of the east-to-west transmitted carrier signal. This modulation, in turn, causes the AGC voltage of i.f. amplifier 26 in receiver 13 to have an a.c. component, provided that the modulation frequency is within the bandwidth of the AGC control loop. This AGC component is then applied to the FM discriminator 41 in feedback circuit 40. The output of discriminator 41 is a d.c. signal whose magnitude is a function of the frequency of the a.c. signal applied thereto. Thus, the d.c. voltage forming the AGC signal of i.f. amplifier 14 in transmitter 10 is a function of the magnitude of the AGC signal in i.f. amplifier 22. If the latter is large, indicating a strong received carrier signal at receiver 11, a correspondingly large AGC voltage is applied to amplifier 14 in transmitter 10, thus reducing the gain of the amplifier and the magnitude of the signal applied to r.f. power amplifier 16. If, on the other hand, a signal fade develops, the AGC voltage in amplifier 22 decreases, thereby decreasing the AGC signal in amplifier 14. This increases the gain of amplifier 14, thereby increasing the output power transmitted by r.f. amplifier 16. Thus, an adaptive transmitter power control is provided with the addition of only an FM deviator at the receiver and an FM discriminator at the transmitter.

As is evident, a similar power control can be provided for the east-to-west channel by the addition of an FM deviator 42 (shown in broken outline) which converts the d.c. component of the AGC signal developed in amplifier 26 to an a.c. signal which modulates the west-to-east carrier, and an FM discriminator 32 (shown in broken outline) which detects the a.c. component of the AGC signal developed in amplifier 22 and converts it to a d.c. signal which controls the gain of amplifier 17. Thus, with a minimum amount of additional circuitry, two-way adaptive transmitter power control is achieved.

An important feature of the invention is the suppression of the a.c. components on the radio signal by the AGC circuits in i.f. amplifiers 22 and 26. This assures that no interference is being caused by these signals in the adjacent radio hops.

The overall power control characteristic is a function of the FM deviator, the FM discriminator, and the gain characteristics of the respective amplifiers. By varying any or all of these parameters any control characteristic can be realized. For example, in a control circuit constructed to test the concept, it was decided to maintain a constant output power for downfades up to 20 dB and upfades up to 5 dB. This was designated as Region I. As the fade increases beyond 20 db, the transmitter power is increased correspondingly. This second interval was designated Region II. Upfades are relatively frequent occurrences which can lead to overdrive conditions in the input stages of receivers 11 and 13. In order to prevent such conditions the transmitter output power is further reduced for upfades higher than 5 dB. FIG. 2 shows the relationship between transmitter power and fade depth for the example just described. Note that during normal and modestly faded conditions, the control system is in effect disconnected and a constant (relatively low) output power is maintained. This contributes to the high reliability of the power control system. The characteristic shown in FIG. 2 can be obtained in various ways by nonlinear shaping of the FM deviator, the FM discriminator and gain and AGC characteristics of the power control loop as is well-known in the art. Such non-linear shaping means is shown in FIG. 1 within dashed lines designated 33 and 43 at the two transceivers. As stated above, however, it should be understood that such non-linear shaping means 33 and 43 actually can be part of the F.M. deviator 31, 42, the FM discriminator 32, 41, and/or the AGC arrangements in elements 22,17 or 26,14, respectively, and is not necessarily a separate circuit.

In the above-described embodiment of the invention, the power control signals are shown as being transmitted over an FM-AM link, piggy-backed on the broadband digital signal traveling in the opposite direction. It will be recognized, however, that this signal can just as readily be transmitted over a separate service (auxiliary, telemetry) channel, if available. Stability of the overall control loop can be achieved by using known techniques of control system design.

What is claimed is:

1. A radio transceiver comprising:

a receiver section capable of receiving an information signal destined for an end user in a predetermined channel from a remote, immediately preceding, transmitter of a radio system, the receiver section comprising amplifier means including an automatic gain control (AGC) arrangement capable of generating a d-c control signal which has a magnitude that (a) is a function of the amplitude of the received information signal at any instant of time and (b) can vary between a predetermined range of amplitude levels;

means responsive to the d-c control signal from the AGC arrangement of the amplifier means in the receiver section for generating an a-c control signal whose frequency is (a) a function of the magnitude of the d-c control signal at any instant of time, and (b) lies within a predetermined band of frequencies within a range of a loop bandwidth of the AGC arrangement of the receiver section; and a transmitter section capable of transmitting an information signal destined for a remote end user in a predetermined transmission channel to a remote, next sequential, receiver of the radio system associated with said remote transmitter, the transmitter section comprising amplifier means including an AGC arrangement which is responsive to the a-c control signal from the generating means for amplitude modulating (AM) the amplitude of the information signal transmitted in the predetermined transmission channel to the remote, next sequential, receiver in accordance with the frequency variations of said a-c control signal from the generating means.

2. A transceiver according to claim 1 where the information signal received from the remote, immediately preceding, transmitter also includes variations in its amplitude which corresponds to frequency variations in an a-c control signal generated at the remote, immediately preceding, transmitter, which frequency variations are a function of the amplitude of the information signal received at the associated remote, next sequential, receiver from the transmitter section at any instant of time, wherein the AGC arrangement in the receiver section is responsive to frequency variations in the amplitude of the received information signal for generating an a-c control signal which is superimposed on the d-c control signal and corresponds to the frequency of said amplitude variations;

the generating means is further responsive to the frequency of the a-c control signal superimposed on said d-c control signal from the AGC arrangement of the amplifier means of the receiver section for generating therefrom a separate d-c control signal which is a function of the frequency of said a-c control signal; and the AGC arrangement of the amplifier means in the transmitter section is responsive to the separate d-c control signal from the generating means for adaptively changing the amplitude of the transmitted information signal as a function of the magnitude of said separate d-c control signal generated by the generating means.

3. A transceiver according to claim 2 wherein the amplifier means including the AGC arrangement in the receiver section includes means which provides a feedback gain which is sufficient to prevent frequency variations in the amplitude of the received information signal from propagating beyond said amplifier means to the destined end user.

4. A transceiver according to claim 1 wherein the transceiver further includes:

means, responsive to the d-c control signals generated by the AGC arrangement in the amplifier means of the receiver section, for causing the generating means to generate a constant frequency a-c control signal when said d-c control signal is within a predetermined range of magnitudes, representing a predetermined range of acceptable amplitude levels of a received information signal, and for adaptively changing the frequency of the a-c control signal when the magnitude of said d-c control signal is above or below said predetermined range of magnitudes.

5. A transceiver according to claim 2 wherein the transceiver further includes:

means, responsive to the a-c control signal superimposed on the d-c control signal generated by the AGC arrangement of the amplifier means in the receiver section, for causing the separate d-c control signal, transmitted to the AGC arrangement of the amplifier means in the transmitter section, to maintain a constant magnitude when said superimposed a-c control signal is within a predetermined frequency band representing a predetermined range of acceptable amplitude levels of a received information signal, and for adaptively changing the magnitude of the separate d-c control signal when the frequency of the superimposed a-c control signal is above or below said predetermined frequency band.

6. A transceiver according to claim 1 wherein the generating means comprises an FM deviator capable of converting the magnitude of the input d-c control signal into an output a-c control signal comprising a frequency which is a function of the magnitude of said d-c control signal.

7. A transceiver according to claim 2 wherein the generating means comprises:

an FM deviator capable of converting the magnitude of the input d-c control signal into an output a-c control signal comprising a frequency which is a function of the magnitude of said d-c control signal; and an FM discriminator capable of converting the a-c control signal, superimposed on the d-c control signal, into the separate output d-c control signal for transmission to the AGC arrangement of the amplifier means in the transmitter section.

8. A transceiver capable of receiving an information signal which is destined for an end user in a predetermined channel from a remote, immediately preceding, transmitter of a radio system, where the information signal includes frequency variations on its amplitude which corresponds to frequency variations in an a-c control signal generated at the remote, immediately preceding, transmitter which is a function of the amplitude of an information signal received from the present transceiver at a remote, next sequential, receiver of the radio system associated with said remote transmitter, the transceiver comprising:

a receiver section capable of receiving the information signal and comprising amplifier means including an automatic gain control (AGC) arrangement capable of generating an a-c control signal whose frequency is a function of the frequency variations in the amplitude of the received information signal;

means, responsive to the frequency of the a-c control signal from the AGC arrangement of the amplifier means in the receiver section for generating therefrom a d-c control signal including a magnitude which is a function of the instantaneous frequency of the a-c control signal; and a transmitter capable of transmitting an information signal which is destined for a remote end user in a predetermined transmission channel to the remote, next sequential, receiver, the transmitter section comprising amplifier means including an AGC arrangement which is responsive to the d-c control signal from the generating means for adaptively changing the amplitude of the transmitted information signal as a function of the instantaneous magnitude of said d-c control signal.

9. A transceiver according to claim 8 wherein the AGC arrangement of the amplifier means in the receiver section is further capable of generating a d-c control signal, on which said a-c control signal is superimposed, which has a magnitude that (a) is a function of the amplitude of the received information signal at any instant of time, and (b) can vary between a predetermined range of levels;

the generating means is also responsive to the d-c control signal from the AGC arrangement of the amplifier means in the receiver section for generating a separate a-c output control signal whose frequency is (a) a function of the instantaneous magnitude of the d-c control signal from AGC arrangement, and (b) lies within a predetermined frequency band within a range of a loop bandwidth of the AGC arrangement; and the AGC arrangement of the amplifier means in the transmitter section is responsive to the separate a-c output control signal from the generating means for amplitude modulating (AM) the amplitude of the information signal being transmitted in the predetermined transmission channel to the remote, next sequential, receiver in accordance with the instantaneous frequency of said a-c output control signal.

10. A transceiver according to claim 8 wherein the transceiver further comprises:

means, responsive to the a-c control signal generated by the AGC arrangement in the amplifier means of the receiver section, for causing the generating means to generate a constant magnitude d-c output control signal when said a-c control signal is within a predetermined band of frequencies, representing a predetermined range of acceptable amplitude levels of a received information signal at the remote, next sequential, receiver, and for adaptively changing the magnitude of the d-c control signal when the frequency of said a-c control signal is above or below said predetermined band of frequencies.

11. A transceiver according to claim 8 wherein the amplifier means including an AGC arrangement in the receiver section further includes means which provides a feedback gain which is sufficient to prevent frequency variations in the amplitude of the received information signal from propagating beyond said amplifier means to the destined end user.

12. A transceiver according to claim 8 wherein the generating means comprises:

an FM discriminator capable of converting the a-c control signal into the d-c control signal for transmission to the AGC arrangement of the amplifier means in the transmitter section.

13. A transceiver according to claim 9 wherein the generating means comprises:
   an FM discriminator capable of converting the a-c control signal into the d-c control signal for transmission to the AGC arrangement of the amplifier means in the transmitter section: and
   an FM deviator capable of converting the magnitude of the d-c control signal into the separate a-c output control signal.

14. A method of providing adaptive transmitted power control for transmissions in a radio system comprising a first transceiver and a second remote, next sequential, transceiver along a radio route, the method comprising the steps of:
   (a) receiving, at the second remote, next sequential, transceiver, an information signal transmitted by the first transceiver in a predetermined channel and destined for an end user at the second remote, next sequential, transceiver;
   (b) generating a d-c control signal at an automatic gain control (AGC) arrangement in a receiver section of the second, next sequential, transceiver which has a magnitude that (1) is a function of the amplitude of the information signal received in step (a), and (2) can vary between a predetermined range of levels;
   (c) generating from the d-c control signal from step (b), an a-c control signal whose frequency (1) is a function of the magnitude of the d-c control signal at any instant of time, and (2) lies within a predetermined band of frequencies which is within a range of a loop bandwidth of an AGC arrangement in a receiver section of the first transceiver;
   (d) amplitude modulating, with a transmitter AGC arrangement and associated amplifier, the amplitude of an information signal transmitted by the second, next sequential, transceiver to the first transceiver in accordance with frequency variations of the a-c control signal generated in step (c); and
   (e) detecting, with a receiver AGC arrangement and associated amplifier at the first transceiver, the amplitude modulations in the amplitude of the information signal transmitted in step (d) for generating therefrom a control signal which is a function of said amplitude modulations and is capable of adaptively modifying the amplitude of a transmission from the first transceiver to the second, next sequential, transceiver.

15. A method of providing adaptive transmitted power control in accordance with claim 14 wherein for step (e), performing the steps of:
   (e1) detecting, with the receiver AGC arrangement, the amplitude modulations in the amplitude of the received information signal;
   (e2) generating an a-c control signal, from the receiver AGC arrangement, which includes an instantaneous frequency that is a function of the detected amplitude modulations in step (e1) and lies within a range of a loop bandwidth of said receiver AGC arrangement;
   (e3) generating from the a-c control signal generated in step (e2), a d-c control signal which has a magnitude that is a function of the frequency of the a-c control signal; and
   (e4) adaptively changing the amplitude of transmitted information signals to the second, next sequential, transceiver as a function of the instantaneous magnitude of the d-c control signal generated in step (e3).

16. A method of providing adaptive transmitted power control in accordance with claim 15 wherein concurrent with performing steps (e2), performing the step of:
   (e5) suppressing the modulations in the amplitude of the received information signal with elements in the receiver AGC arrangement prior to transmission of the information signal to a destined end user.

17. A method of providing adaptive transmitted power control in accordance with claim 14 wherein the method comprises the further steps of:
   (f) concurrent with step (e), generating, in the receiver AGC arrangement at the first transceiver, a d-c control signal including a magnitude that (1) is a function of the amplitude of the information signal received in step (e), and (2) can vary between a predetermined range of levels;
   (g) generating from the d-c control signal from step (f) an a-c control signal whose frequency is (1) a function of the magnitude of the d-c control signal at any instant of time, and (2) lies within a predetermined band of frequencies within a range of a loop bandwidth of the AGC arrangement in the receiver section of the second remote transceiver;
   (h) amplitude modulating the amplitude of a transmitted information signal destined for the second transceiver in accordance with the frequency variations of the a-c control signal generated in step (g); and
   (i) concurrent with steps (a) to (d), at the second, next sequential, transceiver, detecting in the receiver section AGC arrangement, amplitude modulations in the amplitude of an information signal received from the first transceiver for generating, from said detected modulations, a control signal capable of adaptively modifying the amplitude of an information signal transmission of the second, next sequential, transceiver to the first transceiver.

18. A method of providing adaptive transmitted power control in accordance with claim 17 where in performing steps (e) and (i), performing the steps of:
   (j) detecting the amplitude modulations in the amplitude of a received information signal at the associated transceiver, which amplitude modulations comprise a frequency which lies within a range of a loop bandwidth of the AGC arrangement in the receiver section;
   (k) generating an a-c control signal which includes an instantaneous frequency that is a function of the detected amplitude modulations in step (j);
   (l) generating from the a-c control signal generated in step (k), a d-c control signal which has a magnitude that is a function of the frequency of the a-c control signal; and
   (m) adaptively changing, in a transmitter section AGC arrangement and associated amplifier of the associated transceiver, the amplitude of transmitted information signals to the other transceiver as a function of the instantaneous magnitude of the d-c control signal generated in step (l).

* * * * *